(12) United States Patent
Mandt et al.

(10) Patent No.: US 9,751,033 B2
(45) Date of Patent: *Sep. 5, 2017

(54) LIQUID FILTER ARRANGEMENT; COMPONENTS; AND, METHODS

(71) Applicant: Donaldson Company, Inc., Minneapolis, MN (US)

(72) Inventors: Brian Mandt, Shakopee, MN (US); Brent Gulsvig, Faribault, MN (US); John Hacker, Edina, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 280 days.

This patent is subject to a terminal disclaimer.

(21) Appl. No.: 14/471,190

(22) Filed: Aug. 28, 2014

(65) Prior Publication Data

US 2015/0090656 A1  Apr. 2, 2015

Related U.S. Application Data

(63) Continuation of application No. 13/616,628, filed on Sep. 4, 2012, now Pat. No. 8,821,724, which is a
(Continued)

(51) Int. Cl.
*B01D 35/30* (2006.01)
*B01D 27/08* (2006.01)
*B01D 29/15* (2006.01)
*B01D 35/147* (2006.01)
*B01D 35/34* (2006.01)

(52) U.S. Cl.
CPC .............. *B01D 35/30* (2013.01); *B01D 27/08* (2013.01); *B01D 29/15* (2013.01); *B01D 35/147* (2013.01); *B01D 35/34* (2013.01); *B01D 2201/304* (2013.01); *B01D 2201/4046* (2013.01); *B01D 2201/4076* (2013.01)

(58) Field of Classification Search
CPC ........ B01D 35/30; B01D 35/34; B01D 27/08; B01D 35/147; B01D 29/15; B01D 2201/4046; B01D 2201/4076; B01D 2201/304
USPC ....... 210/424, 443, 444, 450, 451, 234, 455, 210/493.2, 439
See application file for complete search history.

(56) References Cited

U.S. PATENT DOCUMENTS 3,232,437 A   2/1966   Hultgren
3,920,553 A   11/1975  Cilento
(Continued)

FOREIGN PATENT DOCUMENTS

FR    2 818 917 A1    7/2002

OTHER PUBLICATIONS

Exhibit A, Pending claims corresponding to U.S. Appl. No. 13/905,267 dated Dec. 8, 2014.
(Continued)

*Primary Examiner* — Madeline Gonzalez
(74) *Attorney, Agent, or Firm* — Merchant & Gould P.C.

(57) ABSTRACT

Liquid filter arrangements are described and shown. The arrangements generally include a filter member comprising a shell enclosing a filter cartridge. Unique features for interface between the enclosed filter cartridge and the shell are provided. Also provided are unique features for interaction between the cartridge and a filter head, in use.

15 Claims, 6 Drawing Sheets

Related U.S. Application Data continuation of application No. 12/316,812, filed on Dec. 16, 2008, now Pat. No. 8,535,530, which is a continuation of application No. 11/600,011, filed on Nov. 14, 2006, now Pat. No. 7,628,280.

(60) Provisional application No. 60/737,441, filed on Nov. 15, 2005.

(56) References Cited

U.S. PATENT DOCUMENTS

| | | | |
|---|---|---|---|
| 4,369,113 A | | 1/1983 | Stifelman |
| 4,419,234 A | | 12/1983 | Miller et al. |
| 4,743,374 A | | 5/1988 | Stifelman |
| 4,989,636 A | | 2/1991 | Hunter et al. |
| 5,080,787 A | | 1/1992 | Brown et al. |
| 5,104,537 A | | 4/1992 | Stifelman |
| 5,476,585 A | | 12/1995 | Mills |
| 5,490,930 A | * | 2/1996 | Krull ............... B01D 27/005 210/443 |
| 5,685,985 A | | 11/1997 | Brown et al. |
| 5,695,637 A | | 12/1997 | Jiang et al. |
| 5,702,602 A | | 12/1997 | Brown et al. |
| 5,738,785 A | | 4/1998 | Brown et al. |
| 5,753,120 A | | 5/1998 | Clausen et al. |
| 5,766,468 A | | 6/1998 | Brown et al. |
| 5,858,227 A | | 1/1999 | Stone et al. |
| 5,885,447 A | | 3/1999 | Theisen et al. |
| 5,904,357 A | | 5/1999 | Demirdogen et al. |
| 5,906,736 A | | 5/1999 | Bounnakhom et al. |
| 5,984,109 A | | 11/1999 | Kanwar et al. |
| 5,988,399 A | | 11/1999 | Brown et al. |
| 5,996,810 A | | 12/1999 | Bounnakhom et al. |
| 6,019,229 A | | 2/2000 | Rao |
| 6,045,693 A | | 4/2000 | Miller et al. |
| 6,099,729 A | | 8/2000 | Cella et al. |
| 6,227,381 B1 | | 5/2001 | Koivula |
| 6,383,244 B1 | | 5/2002 | Wake et al. |
| 6,478,958 B1 | | 11/2002 | Beard et al. |
| 6,499,605 B1 | | 12/2002 | Koivula |
| 6,508,932 B1 | | 1/2003 | Mueller et al. |
| 6,533,933 B1 | | 3/2003 | Stankowski et al. |
| 6,554,139 B1 | | 4/2003 | Maxwell et al. |
| 6,554,140 B2 | | 4/2003 | Steger et al. |
| 6,610,203 B1 | | 8/2003 | Jainek |
| 6,626,299 B1 | | 9/2003 | Brown et al. |
| 6,695,966 B1 | | 2/2004 | Sakraschinsky et al. |
| 6,723,239 B2 | | 4/2004 | Maxwell |
| 6,752,924 B2 | | 6/2004 | Gustafson et al. |
| 6,758,980 B2 | | 7/2004 | Prater et al. |
| 6,787,033 B2 | | 9/2004 | Beard et al. |
| 6,823,996 B2 | | 11/2004 | Durre |
| 7,413,090 B2 | | 8/2008 | Crawford et al. |
| 7,628,280 B2 | | 12/2009 | Mandt et al. |
| 7,850,755 B2 | | 12/2010 | Krull et al. |
| 7,955,502 B2 | | 6/2011 | Greco et al. |
| 8,167,142 B2 | | 5/2012 | Hacker |
| 8,453,848 B2 | | 6/2013 | Hacker |
| 8,535,530 B2 | * | 9/2013 | Mandt ............... B01D 27/08 210/234 |
| 8,821,724 B2 | | 9/2014 | Mandt et al. |
| 2002/0017497 A1 | | 2/2002 | Fritze |
| 2002/0125188 A1 | | 9/2002 | Hacker et al. |
| 2002/0152732 A1 | | 10/2002 | Kallsen et al. |
| 2003/0127384 A1 | | 7/2003 | Kapur |
| 2004/0079693 A1 | | 4/2004 | Hacker et al. |
| 2004/0182777 A1 | | 9/2004 | Stankowski et al. |
| 2005/0000885 A1 | | 1/2005 | Stockbower |
| 2005/0224407 A1 | | 10/2005 | Hacker et al. |
| 2006/0054547 A1 | | 3/2006 | Richmond et al. |
| 2006/0137316 A1 | | 6/2006 | Krull et al. |
| 2006/0157403 A1 | * | 7/2006 | Harder ............... B01D 27/005 210/445 |
| 2007/0138078 A1 | | 6/2007 | Durre |
| 2008/0142426 A1 | | 6/2008 | Greco et al. |

OTHER PUBLICATIONS

Exhibit B, Pending Claims corresponding to U.S. Appl. No. 14/543,023 dated Dec. 8, 2014.
European Search Report corresponding to application EP 11 161 953.2 mailed Oct. 11, 2011.
European Search Report mailed Jun. 17, 2005 corresponding to PCT/US2005/011256.
Search Report and Written Opinion corresponding to PCT/US2006/044396 mailed Mar. 23, 2007.

* cited by examiner

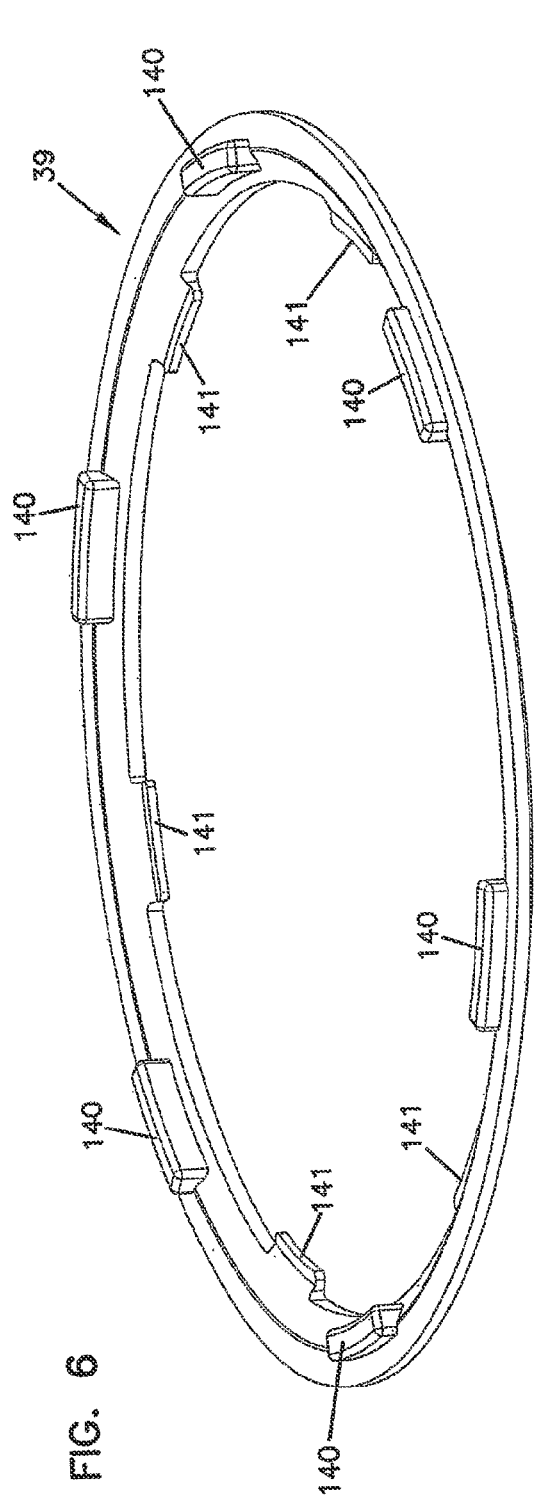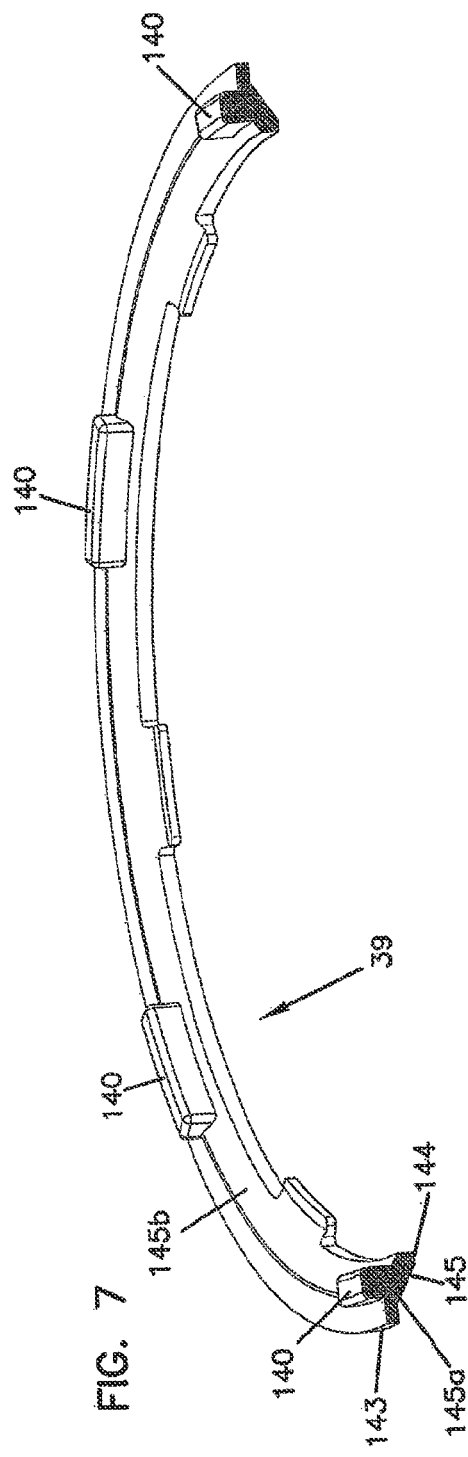

LIQUID FILTER ARRANGEMENT; COMPONENTS; AND, METHODS

CROSS REFERENCE TO RELATED APPLICATION

This application is a continuing application of U.S. Ser. No. 13/616,628, filed Sep. 14, 2012, which has issued as U.S. Pat. No. 8,821,724. U.S. Ser. No. 13/616,628 is a continuation of U.S. Ser. No. 12/316,812, filed Dec. 16, 2008, and issued as U.S. Pat. No. 8,535,530. U.S. Ser. No. 12/316,812 is a continuation application of U.S. Ser. No. 11/600,011, filed Nov. 14, 2006, which has issued as U.S. Pat. No. 7,628,280 and which claims benefit of priority to U.S. 60/737,441 filed Nov. 15, 2005. A claim of priority to U.S. Ser. No. 13/616,628; U.S. Ser. No. 12/316,812; U.S. Ser. No. 11/600,011; and, provisional application Ser. No. 60/737,441, is made to the extent appropriate. Each of U.S. Ser. No. 13/616,628; U.S. Ser. No. 12/316,812; U.S. Ser. No. 11/600,011; and, U.S. 60/737,441 is incorporated herein by reference.

FIELD OF THE INVENTION

The present invention relates to liquid filter arrangements useable, for example, to filter hydraulic fluids and lubricating fluids. A filter head is described on which a serviceable filter cartridge arrangement is positioned in use. Methods of assembly and use are also provided.

BACKGROUND OF THE INVENTION

Circulating liquid systems such as hydraulic fluids and lubricating fluids, typically require a filter arrangement. The filter arrangement is typically positioned so that the fluids are filtered by passage through filter media positioned within the filter arrangement. Typically the filter arrangement is configured so that the componentry containing the media is a service part, i.e., the media can, periodically, be removed and be replaced.

There are two common types of liquid filter arrangements. The first, typically referred to herein as a "spin-on" type, involves a filter head installed on equipment, and a spin-on filter member or cartridge. The filter member or cartridge is often referred to as "spin-on" because the assembly including the filter media is typically secured to the filter head by threading. In spin-on arrangements, the filter media is typically secured within a shell or housing as a housing/media combination, and the entire housing/media combination, as a filter member or cartridge, is removed and replaced during servicing.

The second common type of liquid filter arrangement is referred to herein as a bowl/cartridge arrangement. With a bowl/cartridge arrangement, the filter head is again installed on the equipment. The filter media, however, is contained within a filter cartridge in a form removably positioned within a housing or shell. A housing/cartridge combination is again mounted on the filter head for use. However, during servicing, the housing is disconnected from the filter head, the media contained within the housing or shell is replaced, and the same shell or housing, with the replacement media inside, is then remounted on the filter head.

SUMMARY OF THE DISCLOSURE

According to the present disclosure, a variety of features and techniques are provided that can be implemented in liquid filter arrangements, such as hydraulic filter arrangement or lubricant (oil) filter arrangements. Selected ones of the techniques can be applied in either spin-on filter arrangements or bowl/cartridge filter arrangements, or both.

Techniques described include features incorporated in one or both of the filter head and/or filter member removably mounted on the filter head.

There is no requirement that all of the techniques described herein be incorporated in a given system, for that system to obtain at least some advantage.

BRIEF DESCRIPTION OF THE DRAWINGS

FIG. 6 is an enlarged perspective view of a component used in the assembly of FIG. 1.

FIG. 7 is a cross-sectional view of the component depicted in FIG. 6.

DETAILED DESCRIPTION

I. Description of Drawings

Figure 1:
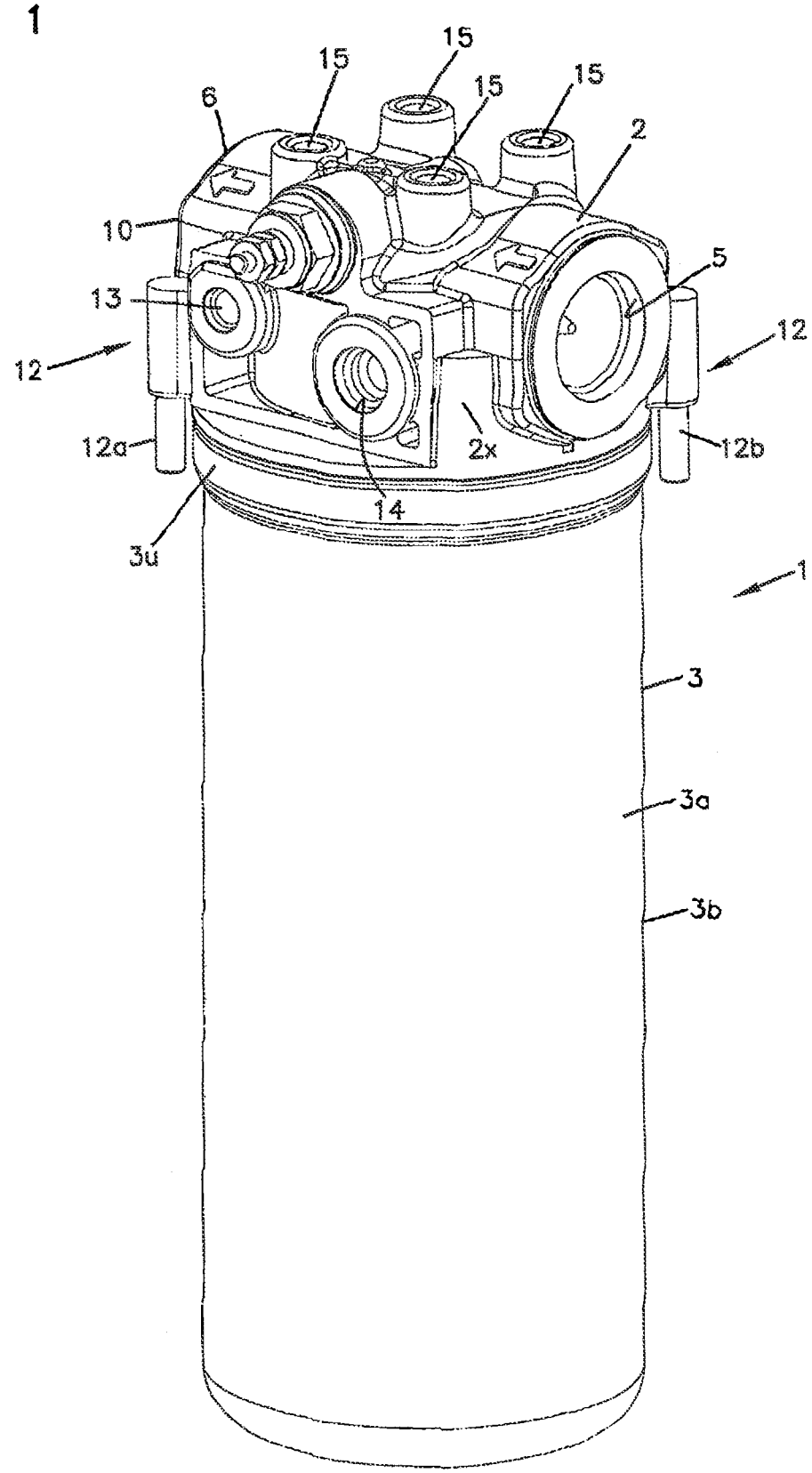
FIG. 1 is a filter assembly comprising a filter head with a filter member mounted thereon, in accord with the present disclosure.

The reference numeral 1, FIG. 1, generally indicates a liquid filter assembly according to the present disclosure. The liquid filter assembly 1 includes a filter head 2 and a filter housing 3. The filter head 2 is typically installed on equipment, in a liquid line, for example a hydraulic line or lubricating fluid (oil) line. During servicing, the filter head 2 would typically remain in place in the equipment.

The filter member or housing 3, on the other hand, is a filter member removably mounted on the filter head 2. During servicing, the filter member or housing 3 is removed from the filter head 2, so that servicing is provided by a replacement of the media contained within the filter member or housing 3 (either with other portions of the housing 3 or separately.) The filter member or housing 3 may be of either the spin-on type or the bowl/cartridge type. The particular filter member or housing 3 depicted in FIG. 1, is a spin-on type 3a. Thus, during servicing, the entire filter member or housing 3 is removed and discarded, and replaced with a new filter member or housing 3.

Herein the term "filter housing 3" is meant to generally refer to a filter member or assembly of the type mounted on the filter head and including media therein, to form the liquid filter arrangement. The term "filter housing" specifically refers to the entire member mounted on the filter head.

Herein the terms "upper" and "lower" are sometimes used to refer to the relative location of components or features. When these terms are used, reference is meant to the orientation of the assembly 1 as depicted in FIGS. 1-3, and further limitation is not meant by these terms unless otherwise specified.

Figure 2:
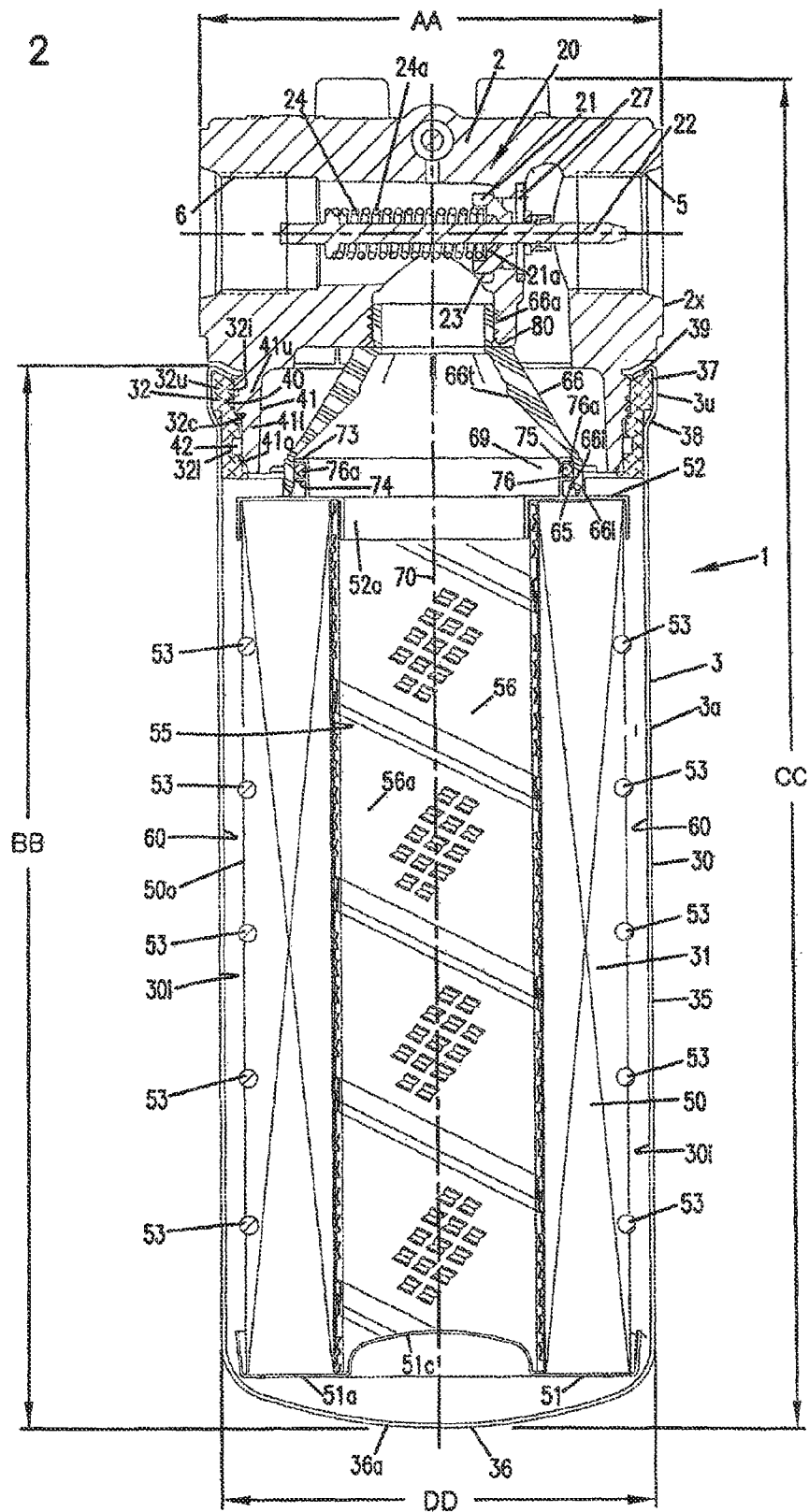
FIG. 2 is a schematic cross-sectional view of the assembly depicted in FIG. 1.
Figure 3:
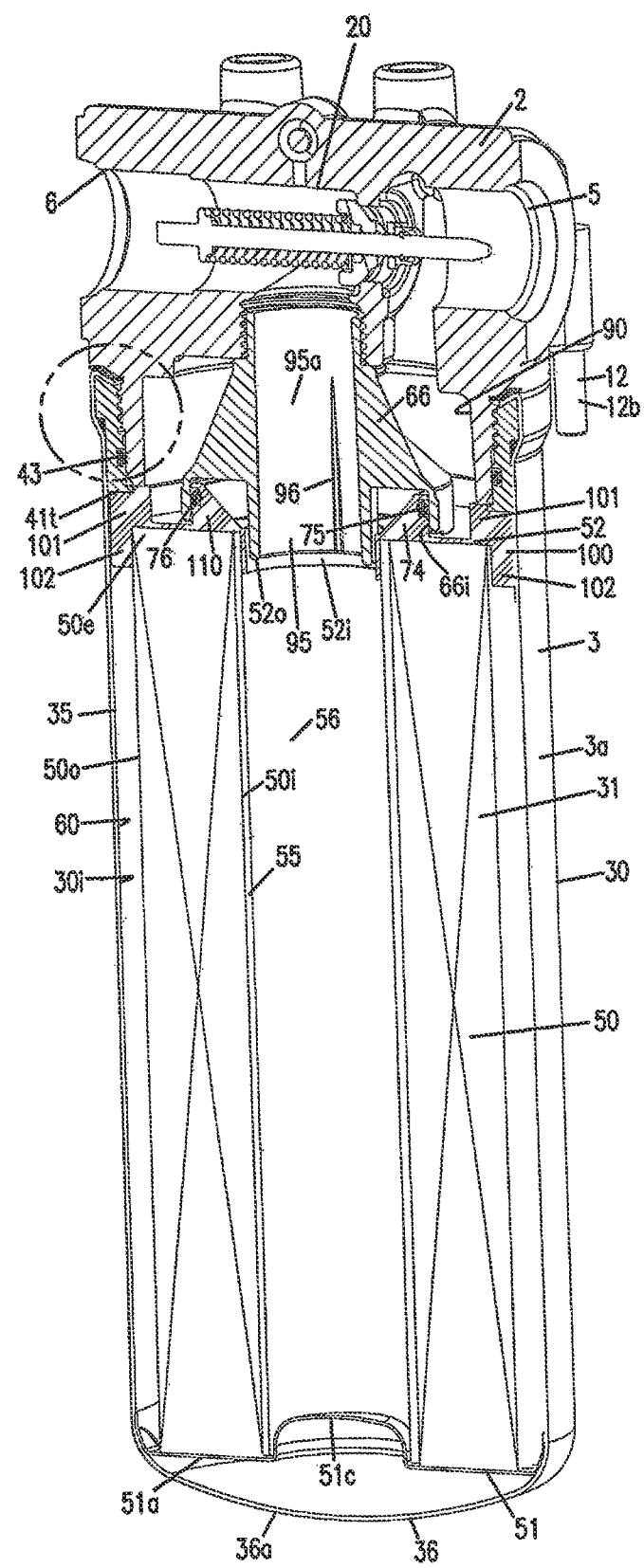
FIG. 3 is a schematic perspective cross-sectional view, of an alternate version of the assembly depicted in FIG. 1.

In a cross-sectional view of FIG. 2, a central longitudinal axis 70 is depicted, around which the filter member 3 is positioned. The terms "axial", "axially" and variants thereof, as used herein, is generally meant to refer to a feature extending in the general direction of the axis 70. The terms "radial", "radially" and variants thereof, are meant to refer to a direction toward or away from the axis 70.

Referring to FIG. 1, the filter head 2 includes a liquid flow inlet 5 and a liquid flow outlet 6. During operation, liquid to be filtered is directed into the filter head 2 through inlet 5. The liquid is then directed through the filter housing 3, for liquid filtration. The filtered liquid is then returned in to the filter head 2, to exit through outlet 6.

Typically, inlet 5 will include a threaded inside, and outlet 6 a threaded inside, for securement of liquid lines for the equipment in which filter head 2 is installed. Alternate modes attachment to the liquid lines can be used, however.

The filter head 2 can include a wide variety of optional structures thereon. At 10 are shown at locations for mounting of an optional solid state sensor or a pressure switch.

At 12 is shown a peripheral, axial, projection arrangement comprising a first projection 12a and a second projection 12b. The peripheral, axial, projection arrangement comprises projections 12a, 12b, that extend axially (downwardly) from an exterior 2x of filter head 2 to depend in radial alignment with (radially adjacent to but spaced from) a portion 34 of filter housing 3 adjacent the filter head, when the housing 3 is mounted. The peripheral, axial, projection arrangement 12 operates as a guide, to help position the filter housing 3 on the filter head 2, during servicing. In addition the projection arrangement 12 helps ensure that a proper filter housing 3 is mounted, since it limits the diameter of the filter housing 3 at end 3a.

Alternately stated, projection arrangement 12 typically comprises a plurality, i.e., at least two, projections 12a, 12b, that project downwardly from an exterior 12x of the filter head 2, to positions radially positioned around, and spaced from, an open end (upper) portion 3u of a filter housing 3 mounted on the filter head z. Usually, 2-8 projections 12a, 12b are used, although in some instances 1 projection may be used.

At 13 and 14 auxiliary ports are located. These can be capped for an assembly according to FIG. 1, or can be used with additional equipment.

At 15 receivers are located. Inside of filter head 2, receivers 15 can receive optional support members, in some alternate uses of filter head 2 from the examples shown.

In a typical system, the filter head 2, except for selected internal componentry discussed below, would comprise a cast metal part, for example cast aluminum, with various features added thereto.

Attention is now directed to FIG. 2, in which a side cross-sectional view of assembly 1 is depicted. In FIG. 2, an example of useable internal components is provided. Referring first to filter head 2, it is noted that mounted within filter head 2 is a bypass valve assembly 20. The bypass valve assembly 20 allows for flow directly from inlet 5 to outlet 6, without passage through filter housing 3, under selected circumstances. Those circumstances would be ones in which media within housing 3 is sufficiently occluded, that an opening pressure for bypass valve assembly is overcome, by a pressure differential between inlet 5 and outlet 6.

The bypass valve assembly 20 comprises a valve head 21 slidably mounted around a valve stem 22, and sealed thereto at seal ring 21a. The valve head 21 is sized, shaped and positioned, to seal against valve seat 23 in head 2, during normal installation. Secure seating is provided by biasing member 24, in this instance a coiled spring 24a, positioned around the valve stem 22 and biasing the valve head 21 into sealing position, in this instance the biasing is toward the flow inlet 5. When the opening force of the spring 24a is overcome by an operating pressure differential between inlet 5 and outlet 6, the valve head 21 will move or slide away from the seat 23, toward outlet 6, allowing liquid flow through an open aperture 27.

Still referring to FIG. 2, the filter housing 3 is shown comprising: an external shell 30; an internally received filter cartridge 31 and top plate 32. Typically, the outer shell 30 comprises a metal component. Typically the top plate 32 is a metal ring, although alternatives are possible.

In general, the shell 30 comprises a sidewall 35, a first, remote (bottom) end 36 (in this instance a closed end 36a), and an opposite, second, open end 37 adjacent the filter head. The example shell 30 depicted includes a seal shoulder 38 and top lip 39. The top plate 32 is positioned with a first (upper) portion 32u secured between lip 39 and seal shoulder 38, and with a second (lower) portion 32l axially depending from portion 32u in a direction toward shell end 36.

FIG. 2 is schematic, and certain seal members and a spacer member are not shown in FIG. 2, although locations for them are. These members are shown and discussed in connection with the modified arrangement of FIG. 3, discussed below.

Still referring to FIG. 2, top plate 32 includes first (upper) portion 32u and second (lower) portion 32l, each disposed around an open center 32c. The first (upper) portion 32u includes an inwardly directed, or inner surface 32i for engagement with threaded region 40 of axially (downwardly) extending post 41 in head 2. More specifically, head 2 includes axially (downwardly) projecting mounting post 41 having a first (upper) region 41u and a second (lower) region 41l. The first (upper) region 41u is positioned for radial alignment with, and engagement with, first (upper) region 32u of top plate 32, during installation. Engagement between regions 41u and 32u, is typically through threaded engagement, as shown.

Second (lower) portion 41l includes an outside seal surface 41o. Second (lower) region 32l of top plate 32 overlaps region 41o with a seal, such as an o-ring seal, therebetween, during installation. In the schematic of FIG. 2, the o-ring is not depicted, however it is shown at 43, in the variation of FIG. 3. In FIG. 2, the seal would be located at 42.

Still referring to FIG. 2, shell 30 defines interior 30i, in which is positioned the filter cartridge 31. The cartridge 31 comprises media 50 positioned in extension between second (lower) end cap 51 and first (upper) end cap 52. The media 50 can comprise a variety of materials as selected for the particular filter operation and conditions to be encountered. Typically the filter media 50 would be provided in a pleated form, although alternatives are possible. A variety of types or shapes of media or media pleats can be used. At 53 coils of adhesive beads around the media 50 to help maintain media integrity and pleat spacing are shown. The media 50 can be lined with a plastic or wire mesh screen, if desired.

The media 50 is configured around, and to define, an open interior 55. Positioned within the open interior 55 is internal media support 56, in this instance comprising a porous liner extending along the media 50 between the end caps 51, 52, and secured to the end caps 51, 52. The particular liner 56 depicted, is a louvered, spiral-wound, edge locked, liner arrangement 56a. Alternate liner arrangements are possible.

Although alternatives are possible, for the example shown, end cap 51 is a closed end cap 51a, meaning it has a closed center 51c prohibiting passage therethrough of unfiltered liquid. The media 50 is generally either potted or adhered to the end cap 51, or the end cap 51 is molded-inplace on the media 50. A variety of materials can be used for the end cap 51. Typically metal or plastic materials are used.

In some applications, end cap 51 can have an aperture therethrough, which is closed (plugged) by other structure within the arrangement to ensure unfiltered liquid does not unacceptably bypass media 50, by flow through the end cap 51.

End cap 52, on the other hand, is typically an open end cap defining a central flow aperture 52*o* therethrough. Aperture 52*o* is positioned in direct flow communication with interior 55 of media 50. Herein the term "direct flow communication", is meant to refer to a passageway that allows a flow communication with interior 55, in a manner that does not require passage through the media 50. That is, liquid within interior 55 can flow through aperture 52*o*, directly, without passing through media at the same time. Of course, the liquid does not reach interior 55, unless it has passed through the media 50 in the first instance, for an "out-to-in" flow arrangement as described.

As indicated, the particular cartridge 31 depicted, is configured for out-to-in flow, during filtering. By this it is meant that unfiltered liquid is directed: (1) from filter head 2 into annulus 60, around the media 50 and between sidewall 35 and the media 50; and (2) then through media 50 into interior 55 and through support 56. This direction of flow will filter the liquid, as it flows from out-to-in through the media 50. The filtered liquid is then directed upwardly through aperture 52*o*, in end cap 52, back into head 2 and then outwardly through exit 6.

It is noted that many of the principles described here can be utilized in association with "in-to-out" flow arrangements, in which the flow direction for liquid being filtered, is in reverse direction, i.e., through aperture 52*o*, then from interior 55 through media 50 into annulus 60. Many of the features shown in FIG. 2 could be reconfigured for such flow, if desired. Example changes that would be necessary, are the location and direction of operation of bypass valve assembly 20, and reversing the flow direction of inlet 5 and outlet 6.

In general, a seal arrangement is needed between the cartridge 31 filter head 2, to prevent liquid flow, except as managed by the bypass valve assembly 20, from bypassing the media 50 as it is directed through filter housing 3. Such a seal arrangement is provided by: seal arrangement 65, on cartridge 31; and, seal adapter 66, mounted on head 2.

For the particular cartridge 31 depicted, the seal arrangement 65 includes a rigid seal mount 69 projecting axially outwardly from end cap 52. The term "outwardly" in this context, is meant to refer to a direction of projection away from the media 50. The mount 69 can be formed (for example molded) integral with a remainder of end cap 52.

Although alternatives are possible, the example mount 69 shown includes a groove defined by spaced flanges 73, 74 that operates as a mounting space 75 for a seal 76. Although variants are possible, in the particular example shown, the mount 69 is configured such that the seal 76 is a radially, outwardly, directed form of seal. The particular seal 76 depicted, is an o-ring 76*a*, although alternatives are possible. As can be seen in FIGS. 2 and 3, the radially, outwardly directed seal 76 forms a seal with inner seal surface 66*i*, upon installation of the filter member 3 to the filter head 2. In FIGS. 2 and 3, it can be seen how the seal 76 is located above, or in axial overlap, with the first end cap 52 and the end of the media 50. As shown in FIGS. 2 and 3, the mounting space 75 is positioned to form a seal diameter with the seal surface 66*i* at a location that is above and axially overlapping the end of the media 50 at the first end cap 52 at a location spaced between an inside perimeter 56 of the media 50 and an outside perimeter of the media 50.

The seal adapter 66 includes first (upper) mounting portion 66*u*; second (lower) seal ring 66*l*; and, conduit region 66*t*. The first (upper) region 66*u* is positioned for mounting engagement with head 2. For the particular example shown, first (upper) region 66*u* has a threaded outer region 67, for threaded engagement with central mounting post 80. Typically and preferably, seal adapter 66, once mounted on head 2, is not removed. Thus, along with the threaded engagement, an adhesive or sealant can be used to secure the parts (2, 66) together.

Second (lower) seal region 66*l*, generally defines a seal surface for engagement with the seal arrangement 65. For the example shown, although an alternative is possible, seal ring 66*l* defines a radially inwardly directed, or inner, seal surface 66*i*, for engagement with an o-ring positioned in receiver 76. The example seal surface 66*i* has a circular, ring, shape.

Seal adapter 66 can be made from a variety of materials. A relatively rigid plastic material will be convenient, for typical use.

Figure 4:
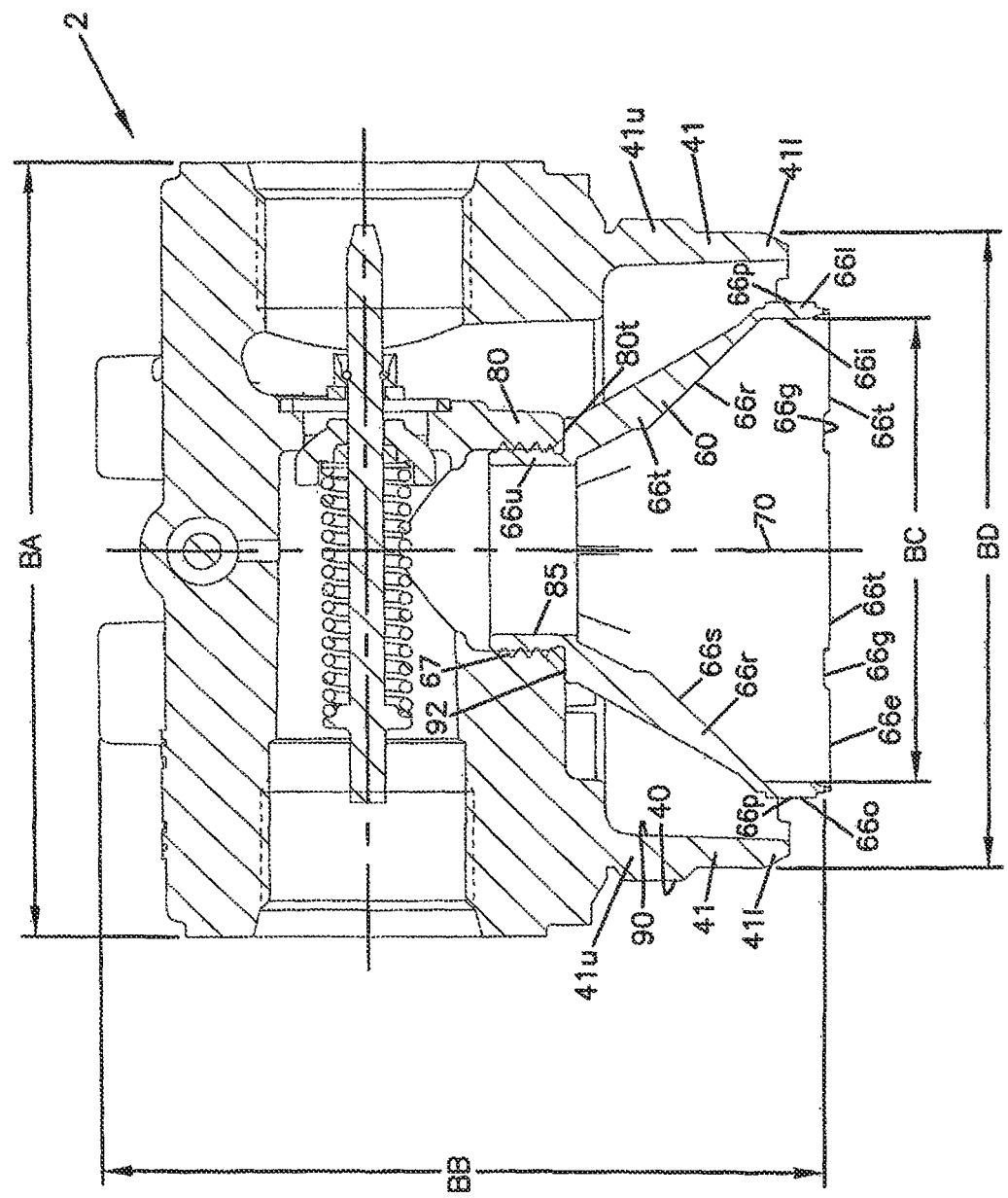
FIG. 4 is an enlarged cross-sectional view of a filter head component of the assembly depicted in FIG. 1, in the form shown in FIG. 2.

In FIG. 4, an enlarged cross-sectional view of a head 2 having seal adapter 66 mounted thereon, is shown. It can be seen that first (upper) portion 66*u* of the adapter ring 66 includes a central aperture 85 therethrough, for liquid flow. That is, liquid can pass into and through adapter 66, to liquid exit 6 in head 2. (In an in-to-out flow operation, unfiltered liquid would flow through aperture 85.)

A radially outer surface 66*o* of second (lower) region 66*l*, includes a plurality of spaced projections 66*p* therein. The projections 66*p* are typically aligned vertically in the installed head 2, i.e. parallel to central axis 70, although alternatives are possible. In FIG. 4, the cross-section is taken through two of the projections 66*p*. The projections 66*p* provide strength to second (lower) region 66*l* on an opposite side of region 66*l* from the sealing surface 66*i*. The projections 66*p* also operate to inhibit improper installation of a filter cartridge, that would involve an effort to seal to surface 66*o*.

Still referring to FIG. 4, adapter 66 includes, projecting axially (downwardly) from lower region 66*l* toward cartridge 31, lower or bottom edge 66*e* comprising spaced projections 66*t* with gaps 66*g* therebetween. The gaps 66*g* help ensure that tip or edge 66*e* will not be used for improper sealing, during installation of a cartridge 31.

Conduit region 66*t*, for the example shown, defines an internal, (in this instance inverted funnel shaped) conduit surface 66*s*, which will help direct liquid to aperture 85, from region 55, during operation. In addition, between adapter 66 and post 41 will be defined in inlet region 90, which is provided direct to filter the liquid from inlet 5 downwardly into annulus 60, FIG. 2. (In an in-to-out flow operation, filtered liquid would flow into region 90 from annulus 60.)

Referring still to FIG. 4, adapter 66 includes (upper) shoulder 92 positioned for engagement with tip 80*t* of mounting post 80 on filter head 2. Sealant can be provided at this region as well as in threads 67, if desired.

Internal ribs are indicated at 66*r*, to strengthen adapter 66, when molded from plastic.

In FIG. 2, some example dimensions are provided as follows: AA=101.6 mm; BB=238.2 mm; CC=301.7 mm; and DD=93.8 mm. In FIG. 4, some example dimensions are provided as follows: BA=101.6 mm; BB=92.2 mm; BC=60.8 mm; and BD=83.4 mm. A system indicated by these dimensions, is typically a hydraulic filter arrangement. Of course alternate dimensions are possible.

Attention is now directed to FIG. 3, a schematic, perspective, cross-sectional view of the assembly 1. It is noted that in FIG. 3, alternate internal structure to that shown in FIG. 2 is depicted. However, selected features that perform analogous operations, are numbered analogously.

In FIG. 3, the adapter 66 is shown modified, in part by including a central tubular extension section 95 on conduit region 66t which projects downwardly through aperture 52o at end cap 52, to a location surrounded by media 50, in particular media end 50e. In the example shown, extension section 95 projects through aperture 52o to a location also surrounded by inner lip 52i of end cap 52, as well as the media end 50e.

Herein, the extension section 95 may be characterized as projecting to a location surrounded by media 50, or by similar terms, whether or not the lip 52i is between the media 50 and the extension section 95. Interior surface 95a is depicted generally cylindrical in shape, with interior reinforcing ribs 96, instead of funnel shape as shown in the example of FIG. 2.

Referring still to FIG. 3, end cap 52 includes spacers or spacer arrangements 100. The spacer arrangements 100 include axial (vertical) spacer portions 101 and radial (horizontal) spacer portions 102. The spacers 100 are spaced on end cap 52, and can be formed integrally therewith. Typically there would be 2-8 spacers 100 positioned on and around end cap 52.

Axial spacer portions 101 are generally positioned to engage lower tip 41t, of post 41, when housing 3 is installed on head 2, inhibiting (controlling) vertical movement of cartridge 31. That is, axial spacer portions 101 are positioned between post 41 and a remainder of the end cap 52, during installation. Engagement between tip 41t and the spacers 101, of end cap 52, occurs in an outer end region of end cap 52 around, and spaced from, seal mount 110.

Radial portions 102 generally provide for centering of cartridge 31 within sidewall 35. That is, portions 102 are generally positioned between shell 30 and a remainder of end cap 52, and cartridge 31, during installation.

For the particular example shown in FIG. 3, seal arrangement 65 is modified, but still comprises axially outwardly directed, rigid seal mount section 110, for strong support of o-ring 76.

Figure 5:
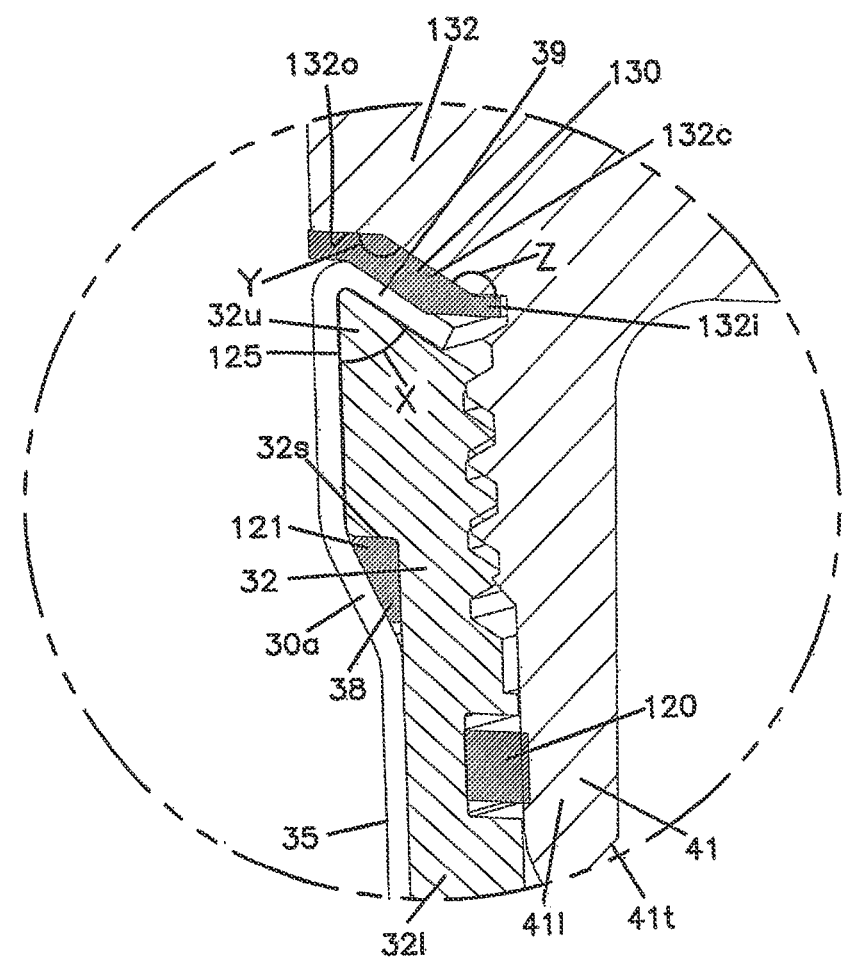
FIG. 5 is an enlarged fragmentary view of a portion of the cross-section depicted in FIG. 3.

Attention is now directed to FIG. 5, which is an enlarged fragmentary view of a portion of FIG. 3. Referring to FIG. 5 several features previously characterized, or referenced, are depicted. First, seal member 120 is depicted supported on lower region 32l of top plate 32, and providing a seal around lower region 41l of mounting post 41, when housing 3 is mounted on filter head 2.

Secondly, gasket 121 is shown positioned between mounting plate 32 and shoulder 38, providing for sealing between sidewall 35 and top plate 32. Although alternate approaches to sealing at this location can be used, the gasket 38 (positioned underneath top plate seal recess or shoulder 32s and above sidewall shoulder 30a) is provided for a seal that has some radial and some axial direction to it, is convenient.

Seal at gasket 121 is facilitated by providing end (upper) lip 39 in the sidewall 35 as shown, which is folded (bent) over an upper portion or tip 32u of the top plate 32. The lip 39 in the example shown, is folded over top plate and 32s to provide an angle x, of typically at least 30°, often at least 40° and usually no greater than 70°, and preferably within the range of 45° to 65°, although alternatives are possible. A similar angle is provided in top surface 32s of top plate 32u, relative to outer surface 125 of upper region 32. This provides for convenient securing of gasket 121, as well as the inhibition against loosening of the joint between the top plate 32 and sidewall 35 at this location.

Referring to FIG. 5, at 130 a spacer ring is shown positioned between lip 39 on sidewall 35, and shoulder 132 and head 2. The spacer ring 130 can be made of a molded plastic material to provide that there will not be a metal-to-metal end engagement during mounting of housing 3 to head 2. Rather, the housing 3 would be threaded onto post 41 until spacer 130 is tightly engaged. The spacer 130 would typically be made from a plastic material, so as to inhibit metal-to-metal contact as an end stop. This means that the threading of the housing 3 on post 41 can be conducted until tight, with less risk of damage to the seal and interface between top plate 32 and housing sidewall 35. Also, ring 130 prevents dust and dirt from interfering with the threaded engagement between top plate 32 and post 41.

Shoulder 132 includes three sections, first (upper) outer ring 132o, central beveled surface 132c and second (lower) inner portion 32i. In cross-section, these portions generally define an open z definition, the term "open" in this context, being meant to refer to the fact that the angles y and z, FIG. 5, are each greater than 90°. The shape defined, provides a convenient engaging surface for the ring 130, while at the same time accommodating lip 39.

In FIGS. 6 and 7 the ring 39 is shown, FIG. 6 being a perspective view and FIG. 7 cross-sectional view.

Referring to FIG. 6, the ring 39 includes vertical (axial) projections 140 extending therefrom. These will nest in mating recess region of head 2, to inhibit rotation of ring 39 when mounted.

Still referring to FIG. 6, ring 39 includes spaced inwardly directed (radial) projections 141. These will engage recesses in head 2, further helping to secure the ring 39 in position, once mounted.

Referring to the cross section of FIG. 7, in general the ring 39 includes an outer ring 143 and inner ring 144 with diagonal, beveled, region 145 therebetween. The beveled region includes an outer, (when mounted in accord with FIGS. 1-3, lower) surface 145a and an inner, (when mounted in accord with FIGS. 1-3, upwardly directed) beveled surface 145b. 145b is oriented to engage surface 132c, 145. Surface 145a, which is opposite surface 145b, is oriented to engage lip 39, FIG. 5. The relationship among 143, section 145, and ring 144, is an open z configuration as characterized above. It is noted that portions of surface 145b are interrupted by projections 140.

Referring to FIGS. 2 and 3, it is noted that in each instance a seal diameter for the seal between the end cap 52 and the seal surface 66i, referred to herein are as DS (seal diameter) is such that the seal location is spaced between an inside surface 50i and an outside surface 50o, of the media 50, across end cap 52. Typically the seal location is spaced from each surface 50o and 50i a distance of at least 10% typically at least 15%, of the distance between the media inside surface 50i and the media inside surface 50o.

In typical arrangements, the seal location Ds will be at a location of 0.85-1.15 Db (typically 0.9-1.1 Db, often 0.93-1.07 Db and usually 0.95-1.05 Db) where Db is a seal diameter for a theoretical seal placed at a location of axial pressure balance for the end cap 52, where an upstream pressure Pu operating on exposed surfaces of the end cap 52 is in balance, with respect to axially directed forces, provided by a downstream pressure Pd also operating on exposed end cap surfaces. Methods of calculating Db for pleated arrangements are described, for example, in PCT/US2005/011256 filed Apr. 4, 2005 and U.S. application Ser. No. 11/098,242 filed Apr. 4, 2005, the complete disclosure of each being incorporated herein by reference.

An advantage from such a seal location, is that it facilitates choice of materials for the filter cartridge 31.

II. General Review

In general terms, according to present disclosure a liquid filter arrangement is provided. The liquid filter arrangement includes a filter head including a first head portion having a liquid flow inlet and a flow liquid outlet, and a second head portion comprising an outer ring projection having an outer surface with a first threaded section and a second seal surface. The first threaded section is axially positioned between the second seal surface and the first head portion, i.e., for the orientation shown in FIGS. 1-3, the first threaded section is positioned above the second seal surface.

The filter head includes, positioned thereon, a central projection positioned on the first head portion surrounded by and spaced radially inwardly from, the second head portion. The central projection defines a cartridge seal surface, typically defining a circular or ring perimeter. Typically the cartridge seal surface is directed radially inwardly, although some of the principles described can be implemented with an oppositely directed seal surface.

In a typical example, the first head portion and second head portion would be integral with one another, as part of a cast metal filter head; and, the central projection would be a separate piece, for example molded from plastic or alternatively made from metal, and attached to the filter head, for example through a threaded connection.

Also the liquid filter arrangement typically includes a liquid filter member, i.e., a serviceable filter arrangement. The liquid filter member typically includes an outer shell having a sidewall defining an interior and an open end. There is also typically an opposite, closed end, and from the open end. The outer shell is typically threadably mounted on the filter head with a seal ring positioned between the liquid filter member and the filter handle. In an example shown, the seal is positioned between a top plate secured inside of the outer shell, and the second seal surface of the second head portion.

A filter cartridge is positioned within the interior of the shell. The cartridge comprises media extending between first and second end caps, which can be metal or plastic. The first end cap is an open end cap with a central aperture. It includes an axially outwardly projecting, typically rigid, seal mount thereon. By "outwardly projecting" in this context, it is meant that the seal mount projects away from the media. The filter cartridge includes a seal mounted on the axially outwardly projecting seal mount. Typically the seal is positioned as an outside radial seal, positioned around the mount, and oriented to seal against the inwardly directed cartridge seal surface of the central projection of the first head portion.

A variety of features usable with such arrangements are described. For example, the filter head can be provided with at least one peripheral guide projection secured to an outside surface of the filter head and oriented to project to a location radially adjacent the outer shell of the liquid filter member, but spaced therefrom.

In an example shown in FIG. 3, the central projection positioned on the first head portion includes a conduit member projecting into the open end cap central aperture of the filter cartridge, terminating at a location surrounded by media. In the example of FIG. 3 shown, positioned between the media and this conduit member, is a portion of the end cap.

In the example shown, a plastic disk is positioned axially between the filter head and an end of the filter shell. A preferred configuration to a plastic disk is shown, having an actual beveled surface region angled with a first side portion facing radially inwardly and toward the first head portion, and a second side portion facing radially outwardly and toward the shell. In an example shown, the first head portion includes a beveled surface adjacent the disc, and the shell includes a beveled tip or lip adjacent the disc on a side of the disc opposite the beveled ring portion of the first head portion.

In the figures, a bypass valve arrangement positioned in the first head portion of the filter head, to selectively permit direct liquid flow from the liquid flow inlet to the liquid flow outlet is shown. By "direct" in this context, it is meant that the bypass valve allows, under appropriate conditions, flow from the liquid flow inlet to the liquid flow outlet, without direction through the filter member and in particular through the filter cartridge within the filter member.

In an examples described, a liquid filter member is a spin-on filter assembly. However, many of the principles described can be applied with a bowl/cartridge filter arrangement, as the liquid filter member.

Detailed features of a liquid filter assembly, useable with the general description above, are also provided.

What is claimed is:
1. A liquid filter member comprising:
   (a) an outer shell having a sidewall defining an interior, a closed end; and, an open end;
   (b) a top plate non-removably secured within the shell such that fluid is prevented from passing between the top plate and the shell from the interior of the shell to the exterior of the shell;
      (i) the top plate having an upper portion and a lower portion;
         (A) the top plate upper portion having an inwardly threaded region by which the filter member can be mounted on a filter head for use; and,
         (B) the top plate having an upper tip;
   (c) an upper lip of the shell being folded over a surface of the top plate upper tip to extend at an acute angle of at least 30° relative to a portion of the sidewall of the outer shell;
   (d) a seal member positioned between the top plate and the shell;
   (e) a filter cartridge non-removably positioned within the interior of the shell, positioned with media at a location between a portion of the top plate and the closed end of the shell;
      (i) the filter cartridge comprising pleated media extending between first and second ends;
      (ii) the first end having an open end piece thereon; and,
      (iii) the second end having a closed end piece thereon; and,
   (f) a radially outwardly directed seal member positioned to form a seal, upon installation, at a location in axial overlap with the first end of the media.
2. A liquid filter member according to claim 1 wherein:
   (a) the upper lip of the shell is folded to extend at an acute angle of at least 30° relative to a portion of the sidewall of the outer shell.

3. A liquid filter member according to claim 1 wherein:
(a) the open end piece comprises a first end cap includes a seal mount positioned thereon, on which the seal member is positioned.

4. A liquid filter member according to claim 3 wherein:
(a) the first end cap includes the seal mount non-removably positioned thereon.

5. A liquid filter member according to claim 4 wherein:
(a) the seal mount is integrally formed with a remainder of the first end cap.

6. A liquid filter member according to claim 3 wherein:
(a) the top plate lower portion includes a radially directed seal-receiving groove therein.

7. A liquid filter member according to claim 1 wherein:
(a) the top plate lower portion includes a radially directed seal-receiving groove therein.

8. A liquid filter member configured to be threadably mounted on a filter head, the liquid filter member comprising:
(a) an outer shell having a sidewall defining an interior and a first, open, end;
(b) a filter cartridge non-removably positioned within the interior of the shell;
  (i) the filter cartridge comprising pleated media extending between first and second end caps;
    (A) the media defining pleat tip inner and outer perimeters;
  (ii) the first end cap being an open end cap with a central aperture;
(c) an axially outwardly projecting seal mount;
  (i) the filter cartridge including a seal mounted on the axially outwardly projecting seal mount and configured to form an outwardly directed radial seal against a seal surface supported by the filter head when the liquid filter member is disposed in position for use; and,
  (ii) the seal mount being positioned to support the seal at a location to form a seal diameter with the seal surface at a location in axial overlap with an end of the media at a location spaced between an inside perimeter of the media and an outside perimeter of the media; and,
  (iii) the second end cap being closed; and,
(d) a top plate non-removably secured within the shell such that fluid is prevented from passing between the top plate and the shell from the interior of the shell to the exterior of the shell, the top plate having an upper portion and a lower portion;
  (i) the top plate upper portion having an inwardly threaded region by which the filter member can be mounted on a filter head for use; and,
  (ii) the top plate including:
    (A) a first region, having the inside threaded region, positioned below the top of the shell; and,
    (B) a second region extending axially away from the first region and away from the first, open, end of the outer shell.

9. A liquid filter member according to claim 8 wherein:
(a) the outer shell has a closed end opposite the first, open, end.

10. A liquid filter member according to claim 9 wherein:
(a) the seal mounted on the axially outwardly projecting seal mount comprises an o-ring.

11. A liquid filter member according to claim 10 wherein:
(a) the first end cap includes the seal mount positioned thereon.

12. A liquid filter member according to claim 11 wherein:
(a) the first end cap includes the seal mount non-removably positioned thereon.

13. A liquid filter member according to claim 12 wherein:
(a) the seal mount is integrally formed with a remainder of the first end cap.

14. A liquid filter member according to claim 10 wherein:
(a) the top plate lower portion includes a radially directed seal-receiving groove therein.

15. A liquid filter member according claim 14 wherein:
(a) the shell includes a lip folded over an end of the top plate.

* * * * *